US 6,622,647 B2

(12) United States Patent
DePoy

(10) Patent No.: US 6,622,647 B2
(45) Date of Patent: Sep. 23, 2003

(54) ACTIVE NOISE CANCELLATION FOR A TORPEDO SEEKER HEAD

(76) Inventor: Martin L. DePoy, 494 E. Lake St., Cleveland, NY (US) 13042

( * ) Notice: Subject to any disclaimer, the term of this patent is extended or adjusted under 35 U.S.C. 154(b) by 0 days.

(21) Appl. No.: 09/891,228

(22) Filed: Jun. 26, 2001

(65) Prior Publication Data

US 2003/0005872 A1 Jan. 9, 2003

(51) Int. Cl.[7] .................... F42B 19/01; G01S 3/80
(52) U.S. Cl. .................. 114/21.3; 114/23; 367/124; 367/129; 367/153; 367/901
(58) Field of Search .............. 114/21.3, 23; 367/20, 367/119, 120, 124, 129, 153, 155, 901

(56) References Cited

U.S. PATENT DOCUMENTS

| | | | |
|---|---|---|---|
| 2,043,416 A | | 6/1936 | Lueg ...................... 381/71.1 |
| 3,444,508 A | | 5/1969 | Granfors et al. ............. 367/3 |
| 3,603,921 A | | 9/1971 | Dreisback ................. 340/10 |
| 3,987,404 A | | 10/1976 | Woodruff ................. 340/6 R |
| 4,078,222 A | | 3/1978 | Woodruff ................. 340/6 R |
| 4,192,246 A | * | 3/1980 | Hodges et al. ............. 114/23 |
| 4,205,396 A | | 5/1980 | Pryor, Jr. ................. 367/125 |
| 4,305,159 A | | 12/1981 | Stromswold et al. ....... 455/226 |
| 4,308,538 A | | 12/1981 | Albersheim .............. 343/16 M |
| 4,372,239 A | | 2/1983 | Hagelberg et al. ........ 114/20 A |
| 4,654,871 A | | 3/1987 | Chaplin et al. ............. 381/72 |
| 4,878,188 A | | 10/1989 | Ziegler, Jr. ............. 364/724.01 |
| 5,010,576 A | | 4/1991 | Hill ........................ 381/71 |
| 5,077,696 A | * | 12/1991 | McEachern et al. .......... 367/12 |
| 5,146,505 A | | 9/1992 | Pfaff et al. ................. 381/71 |
| 5,253,221 A | | 10/1993 | Coulbourn ................ 367/135 |
| 5,307,325 A | * | 4/1994 | Scheiber .................. 367/178 |
| 5,359,662 A | | 10/1994 | Yuan et al. ................. 381/71 |
| 5,457,662 A | | 10/1995 | Forster .................... 367/119 |
| 5,502,770 A | | 3/1996 | Kuo et al. .................. 381/71 |
| 5,708,232 A | * | 1/1998 | Nedderman, Jr. ............ 114/23 |
| 5,825,898 A | * | 10/1998 | Marash ..................... 381/92 |
| 6,108,270 A | * | 8/2000 | DePoy, II ................. 367/124 |
| 6,408,978 B1 | * | 6/2002 | Premus .................... 181/120 |
| 6,525,994 B2 | * | 2/2003 | Donald et al. ............. 367/130 |

OTHER PUBLICATIONS

G.P. Haddle and E.J. Skudrzyk, "The Physics of Flow Noise," J. Acoust. Soc. Amer., vol. 46, No. 1 (Part 2), pp. 130–157, 1969.
S.M. Kuo and D.R. Morgan, "Active Noise Control: A Tutorial Review," IEEE Proceedings 87(6), Jun. 1999.

* cited by examiner

Primary Examiner—Michael J. Carone
Assistant Examiner—H. A. Blackner
(74) Attorney, Agent, or Firm—Rothwell, Figg, Ernst & Manbeck

(57) ABSTRACT

A noise cancellation system and method for use with a seeker head of a marine vessel are provided according to the invention. The seeker head employs one or more hydrophones that generate one or more output signals. The noise cancellation system includes a plurality of motion sensors. The plurality of motion sensors generate a plurality of noise signals based on a hydrodynamic flow noise caused by the marine vessel and acting on the marine vessel. The noise cancellation system further includes a processor receiving the plurality of noise signals and the one or more output signals and applying an active noise cancellation to the one or more output signals to substantially cancel out the flow noise. The active noise cancellation is based on the noise signal.

8 Claims, 8 Drawing Sheets

ACTIVE NOISE CANCELLATION FOR A TORPEDO SEEKER HEAD

BACKGROUND OF THE INVENTION

1. Field of the Invention

The present invention relates generally to a sonar seeker head, and more particularly to a sonar seeker head employing active noise cancellation.

2. Description of the Background Art

Acoustic (i.e., sound) waves have long been used as a method of detecting objects undersea. Because acoustic waves are the type of waves that propagate best through water, they are the choice for applications such as undersea warfare (USW). Active sonar (i.e., Sound Navigation And Ranging), is an application of acoustic waves wherein direction and distance to a target may be obtained through the detection of reflected acoustic waves.

Sonar may be of two types, active or passive. Active sonar emits acoustic waves toward a target and picks up reflected waves to determine direction and distance. Passive sonar does not emit any acoustic waves, but only picks up acoustic waves emitted by the target. Passive sonar therefore has an advantage in that it is less likely to give away its own location. Passive sonar is often used when it is desired that the device not transmit any acoustic waves that might be used by the target to locate or track the emitting device, or even alert the target to the presence of the emitting device.

Sonar devices pick up undersea acoustic waves through the use of a transducer called a hydrophone. The hydrophone is capable of converting received acoustic waves into electrical signals that can be analyzed.

Sonar has practical application in the use of guidance of many types of marine vessels, including unmanned weapons such as torpedoes. A torpedo is essentially a warhead attached to a propulsion system and a guidance system. Without an effective guidance system, a torpedo is a blind missile. A sonar guidance system in the form of a seeker head is capable of detecting a target and guiding the torpedo to the target. The seeker head is capable of detecting target sound, whether it be reflected sound or sound emitted by the target (such as propulsion noise generated by the target).

FIG. 1 shows a first type of seeker head array that employs phase differences in received sound in order to determine the direction of origin of the sound source. The phased array seeker head is commonly located in a nose area of the torpedo 100 or other vessel, and is accompanied by amplifying and processing circuits. This torpedo seeker head configuration is generally constructed with a flat torpedo nose. Multiple hydrophone detection elements 103, typically configured in an array, are used in these acoustic torpedo seeker heads to observe phase differences. This seeker head observes differences in phase of the incoming acoustic signal as detected by the detection elements to determine direction of the target. For example, if the phase angle of the signal produced by the hydrophone elements on the right-hand side of the array is ahead of the phase angle of those on the left-hand side, the seeker head calculates that the target lies to the right of the axis of the seeker head. Conversely, if the phase angle of the signal produced by the hydrophone elements of the left hand side, upper side, or lower side are ahead of the phase angle of the hydrophones on the opposite side of the array, the derived "look" angle (the discerned direction of the target relative to the axis of the torpedo) indicates that the target lies to the left, above, or below the seeker head, respectively. The greater the difference in phase angle, the greater the look angle between the direction to the acoustic source and the axis of the seeker head.

FIG. 2 shows a hydrophone cluster 200 of another torpedo seeker head configuration that is capable of direction detection independent of frequency. This torpedo seeker head configuration is disclosed in U.S. Pat. 6,108,270 to DePoy, and is incorporated herein by reference. This frequency-independent seeker head includes three orthogonal directional hydrophones 203, 207, and 215, and one omni-directional hydrophone 212. This enables the hydrophone cluster 200 to find a sonic direction in three dimensions. The hydrophone cluster 200 may be located in a forward portion of a torpedo weapon, a submarine, a surface ship, or other marine vessel. In an alternate embodiment, the hydrophone cluster 200 may contain only two directional hydrophones and an omni-directional hydrophone, enabling a sonic direction to be found in two dimensions, or in three dimensions, if a non-resolvable between directions on either side of the plane of the two directional hydrophones can be admitted.

In the figure, orthogonal directional hydrophone 203 has a response pattern aligned with its axis M—M, orthogonal directional hydrophone 207 has a response pattern aligned with its axis N—N (orthogonal to axis M—M), and orthogonal directional hydrophone 215 has a response pattern orthogonal to the response patterns of the other two directional hydrophones and aligned with an orthogonal vertical axis coming vertically out of the figure. Any suitable directional response pattern may be used for the orthogonal directional hydrophones 203, 207 and 215.

Hydrophone 212 is an omni-directional hydrophone, picking up acoustic signals in all directions. The omni-directional hydrophone 212 has a spherical response pattern with the omni-directional hydrophone 212 being located in the center of the sphere. An acoustic signal is received by the omni-directional hydrophone 212 at a constant phase and signal strength regardless of the directional position of the acoustic signal source in relation to the omni-directional hydrophone 212.

In accordance with the present invention, a look angle in a plane defined by any two directional hydrophones may be found by combining the outputs from two of the three hydrophones and using a phase from the omni-directional hydrophone 212. By using appropriate combinations of hydrophone pairs, look angles in all three dimensions may be found. The resulting look angles may be used to guide a torpedo or other such marine vessel.

A common problem for acoustic torpedo seeker heads or any type of sonar detector is "ownship" noise. Ownship noise has three principal components: screw noise, propulsion system machinery noise, and hydrodynamic noise.

Screw noise is the noise made by a turning propeller screw. At medium to high torpedo speeds, propeller noise occurs at medium to high acoustic frequencies, i.e., above the frequency passband of a seeker head operating at low frequency, hence screw noise need not be eliminated.

Torpedo machinery noise was extensively studied and measured during World War II. Machinery noise has been found to include mostly rather weak tonals occurring at low frequencies. Machinery noise is mostly independent of speed, and is chiefly structure borne. It occurs chiefly at low frequency, and is important at low speed, where other sources of low frequency noise are diminished. At higher speeds, such as at the speeds typically obtained by modern torpedoes, it is much weaker than hydrodynamic noise.

Hydrodynamic noise includes all noise resulting from the flow of water past the hydrophone, any hydrophone support structures, and the outer hull structure of the torpedo. It includes the turbulent pressures produced upon the hydrophone face in the turbulent boundary layer of the flow (flow noise), rattles and vibration induced in the hull plating, cavitation around appendages, and the noise radiated to a distance by distant vortices in the flow. Hydrodynamic noise increases strongly with speed, and because the origin of this noise lies close to the hydrophone, it is the principle source of noise at high speeds whenever the noise of propeller cavitation (itself a form of hydrodynamic noise) is insignificant.

A particular kind of hydrodynamic noise has been termed flow noise. Flow noise consists of the pressures impinging upon the hydrophone face created by turbulent flow. Although these turbulent pressures are not true sound, in that they are not propagated to a distance, they form what has been termed pseudosound and may give rise to a fluctuating noise voltage at the output of a pressure hydrophone.

FIG. 3 illustrates the mechanism of flow noise. As the water flows around the torpedo 100, at some point the flow separates from the torpedo 100 and becomes turbulent. The turbulent flow may create forces on the torpedo, and which may be formed of the force components $F_x$, $F_y$, and $F_z$, as shown.

Flow noise does not vary in frequency with vessel speed. Rather, it varies markedly in amplitude with speed, while the sonic noise strength varies inversely with frequency at a rate of approximately 9 decibels (db) per octave.

FIG. 4 shows measured flow noise levels at a variety of speeds and for two hydrophone sizes. The figure is a result of a study of flow noise in *The Physics of Flow Noise*, G. P. Haddle and E. J. Skudrzyk, J. Acoust. Soc. Amer., vol. 46, 1969, incorporated herein by reference. The nose of the torpedo 100 passing through the water gives the water a component of velocity away from the torpedo, thus causing a low pressure volume alongside the torpedo, into which the water returns in a turbulent fashion. This turbulence pounds the aft end of the torpedo 100, thereby inducing low frequency noise in the torpedo 100. This low frequency noise travels forward through the structure of the torpedo 100. The resultant vibration in the seeker head at the forward end of the torpedo 100 causes a vibration interaction between the hydrophone and the water. This interaction, i.e., flow noise, is impossible to distinguish from noise in the water itself, and interferes with target detection.

If the principal operating frequency of the torpedo seeker head is at a medium to high frequency, the effects of flow noise are minimized. Alternatively, if the principal operating frequency of the torpedo seeker head is at low frequency, the effects of screw noise are avoided. Machinery noise, being significantly weaker than flow noise at most torpedo speeds, can be neglected.

Therefore, there is a need for a means of discriminating against, or wholly or partially canceling, ownship noise, in order to enhance the in-band signal-to-noise ratio at the hydrophones, and hence to enhance the seeker head performance. A directional hydrophone seeker head, while able to operate at any frequency, is able to operate at low frequency. Operation at low frequency is desirable because the anechoic coatings applied to most, if not all, combat submarines today are ineffective or non-operative at low frequency.

The directional hydrophone configuration of a torpedo seeker head, as shown in FIG. 2, may avoid the effects of ownship screw noise and ownship propulsion machinery noise. This is because such a configuration is independent of frequency and may look at frequency bands outside of the screw noise and machinery noise frequency bands. However, this type of seeker head will be affected by flow noise.

What is needed, therefore, are improvements in torpedo seeker heads to reduce flow noise.

SUMMARY OF THE INVENTION

A noise cancellation system adapted for use with a seeker head of a marine vessel is provided according to one embodiment of the invention. The seeker head employs one or more hydrophones that generate one or more output signals. The noise cancellation system comprises a plurality of motion sensors. The plurality of motion sensors generate a plurality of noise signals based on a hydrodynamic flow noise caused by the marine vessel and acting on the marine vessel. The noise cancellation system further comprises a processor receiving the plurality of noise signals and the one or more output signals and applying an active noise cancellation to the one or more output signals to substantially cancel out the flow noise. The active noise cancellation is based on the noise signal.

A hydrodynamic flow noise reduction shroud adapted for use with a torpedo is provided according to one embodiment of the invention. The shroud comprises a substantially ring-shaped shroud extending between a leading edge and a trailing edge and includes a front aperture and a rear aperture. The shroud is adapted to be affixed over a nose portion of the torpedo. The shroud further comprises a plurality of pylons adapted to affix the shroud in a spaced-apart relation from the nose portion.

A method of noise cancellation for one or more output signals generated by one or more hydrophones of a seeker head of a marine vessel is provided according to one embodiment of the invention. The method comprises the step of generating a noise signal based on a hydrodynamic flow noise caused by the marine vessel and acting on the marine vessel. The method further comprises the step of applying an active noise cancellation to the one or more output signals to substantially cancel out the flow noise. The active noise cancellation is based on the noise signal.

A method of noise cancellation for a seeker head of a marine vessel is provided according to another embodiment of the invention. The noise cancellation is provided for one or more output signals generated by one or more hydrophones of the seeker head. The method comprises the step of generating a noise signal based on a hydrodynamic flow noise caused by the marine vessel and acting on the marine vessel. The method further comprises the step of mechanically moving the seeker head. The method further comprises the step of electronically subtracting the noise signal from the one or more output signals. The moving and subtracting are based on the noise signal and substantially cancel out the flow noise.

The above and other features and advantages of the present invention will be further understood from the following description of the preferred embodiments thereof, taken in conjunction with the accompanying drawings.

DETAILED DESCRIPTION OF THE PREFERRED EMBODIMENTS

Figure 1:
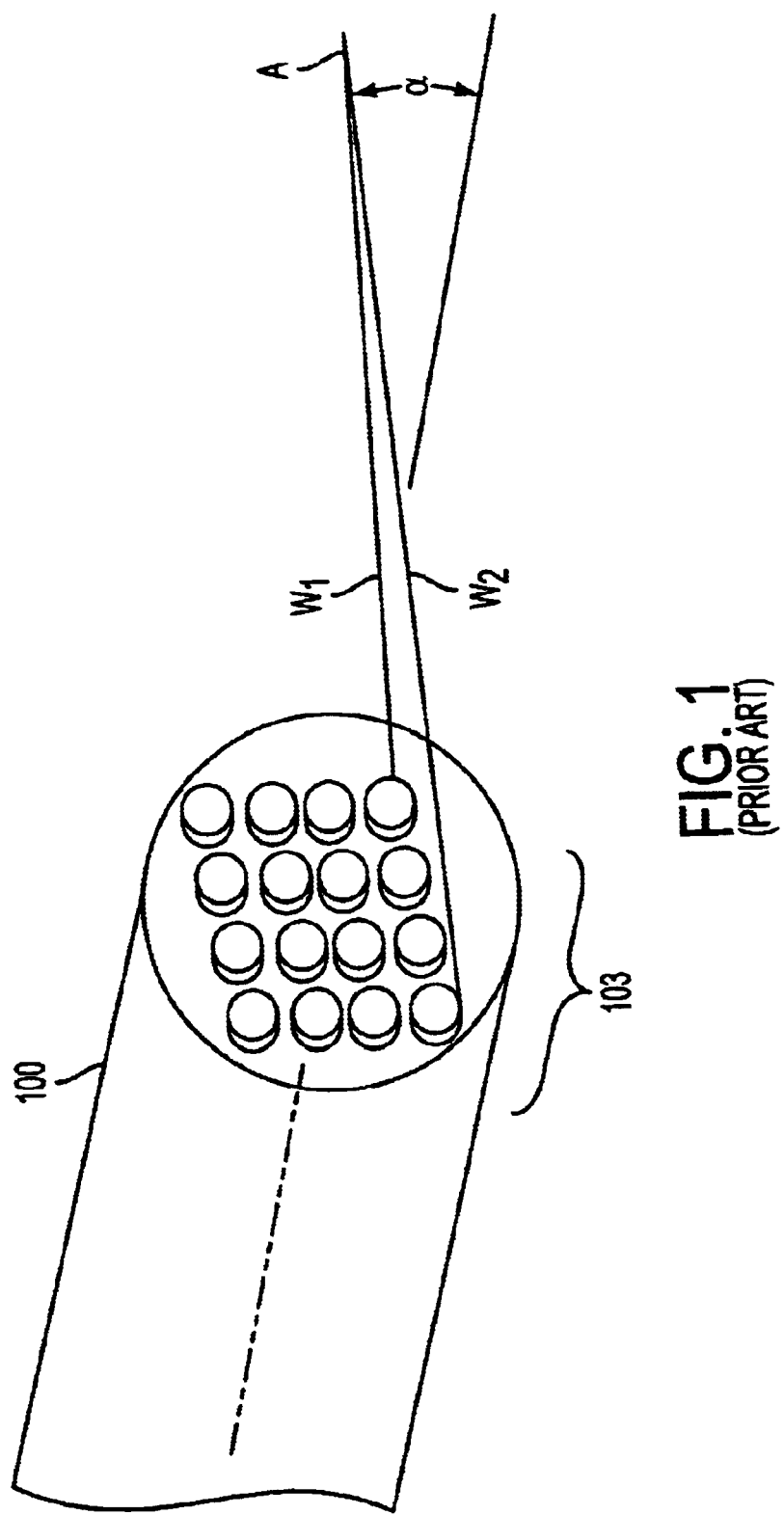
FIG. 1 shows a first type of seeker head array that employs phase differences in received sound in order to determine a direction to the sound source.
Figure 2:
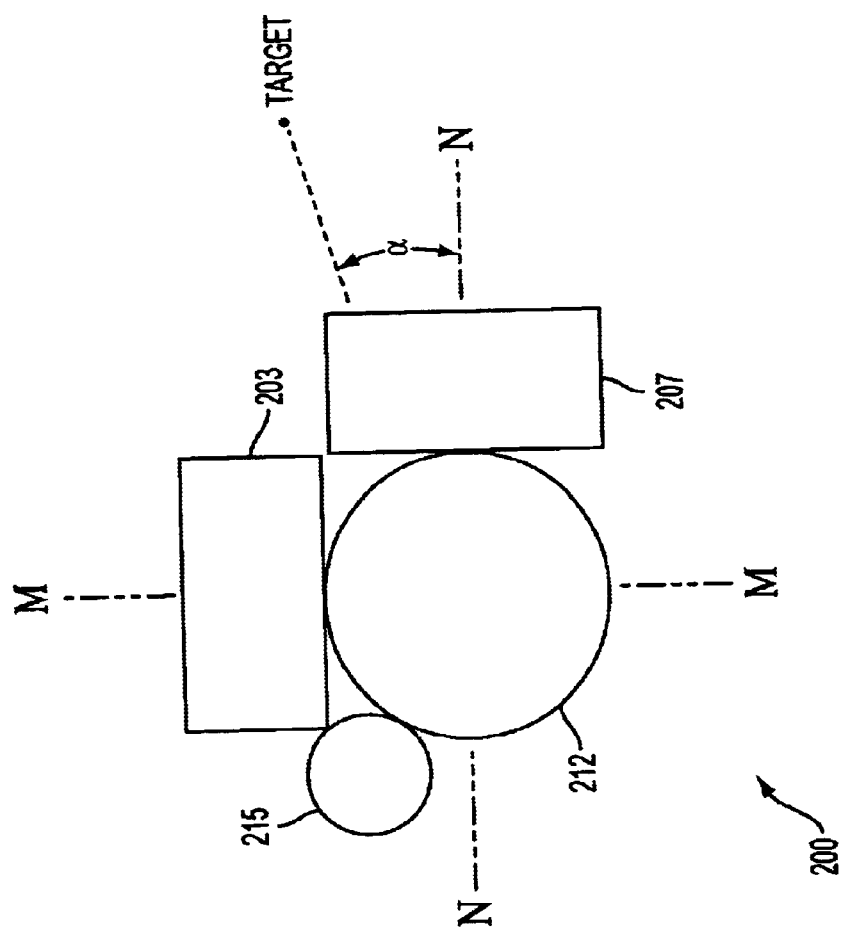
FIG. 2 shows a hydrophone cluster of another torpedo seeker head configuration that is capable of direction detection independent of frequency.
Figure 3:
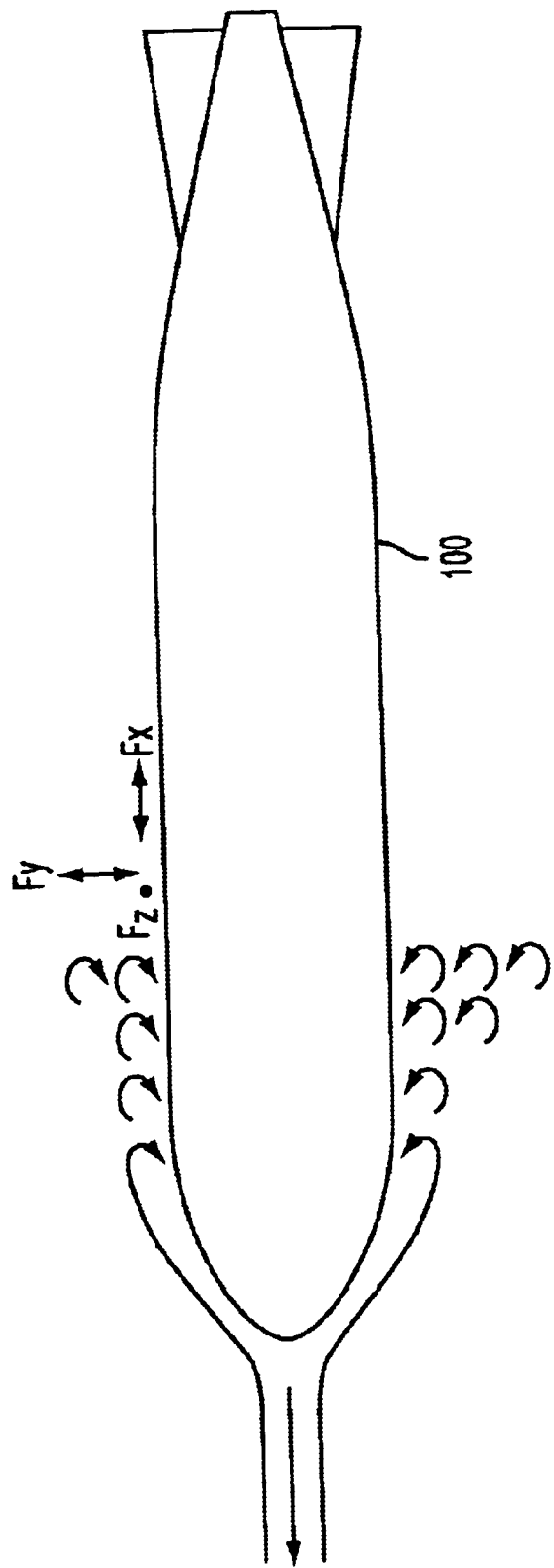
FIG. 3 illustrates the mechanism of flow noise.
Figure 4:
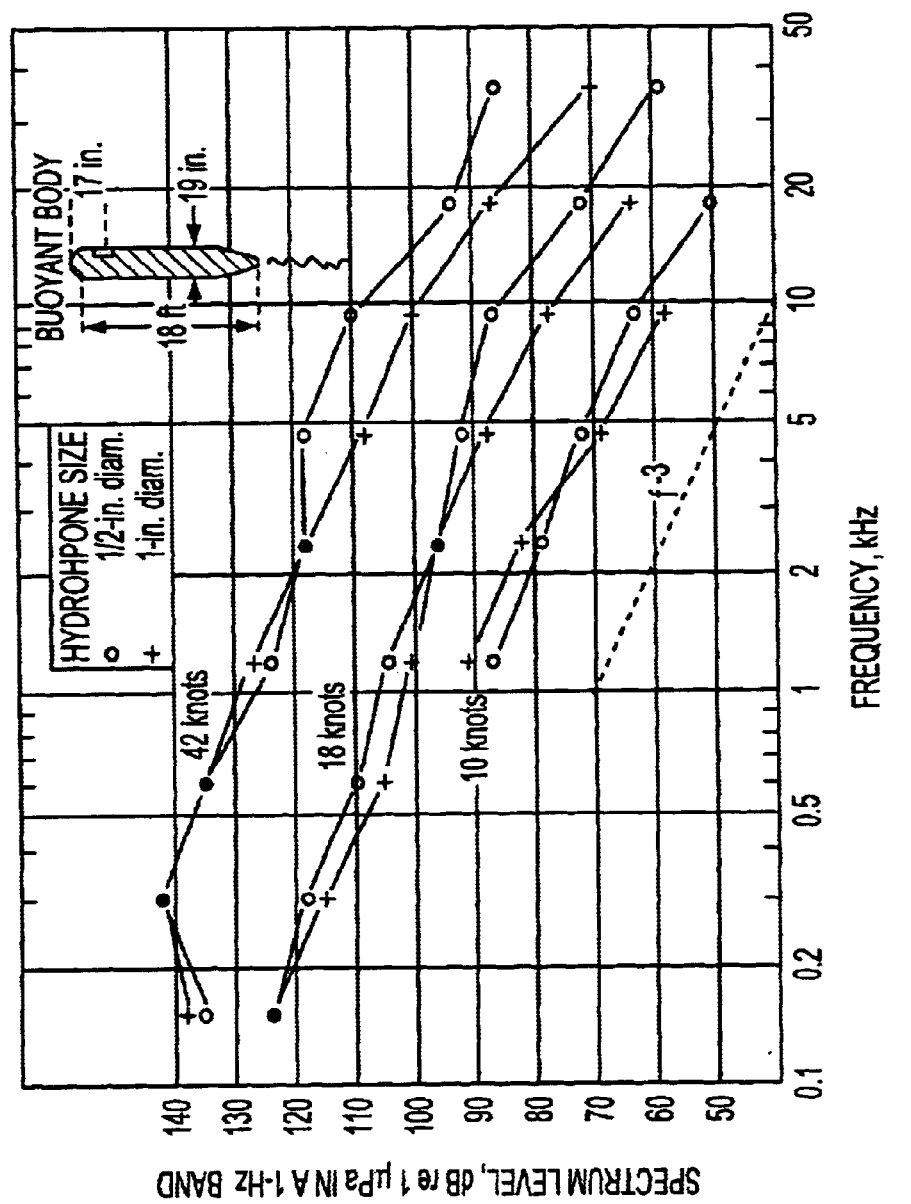
FIG. 4 shows measured flow noise levels at a variety of speeds and for two hydrophone sizes.
Figure 5:
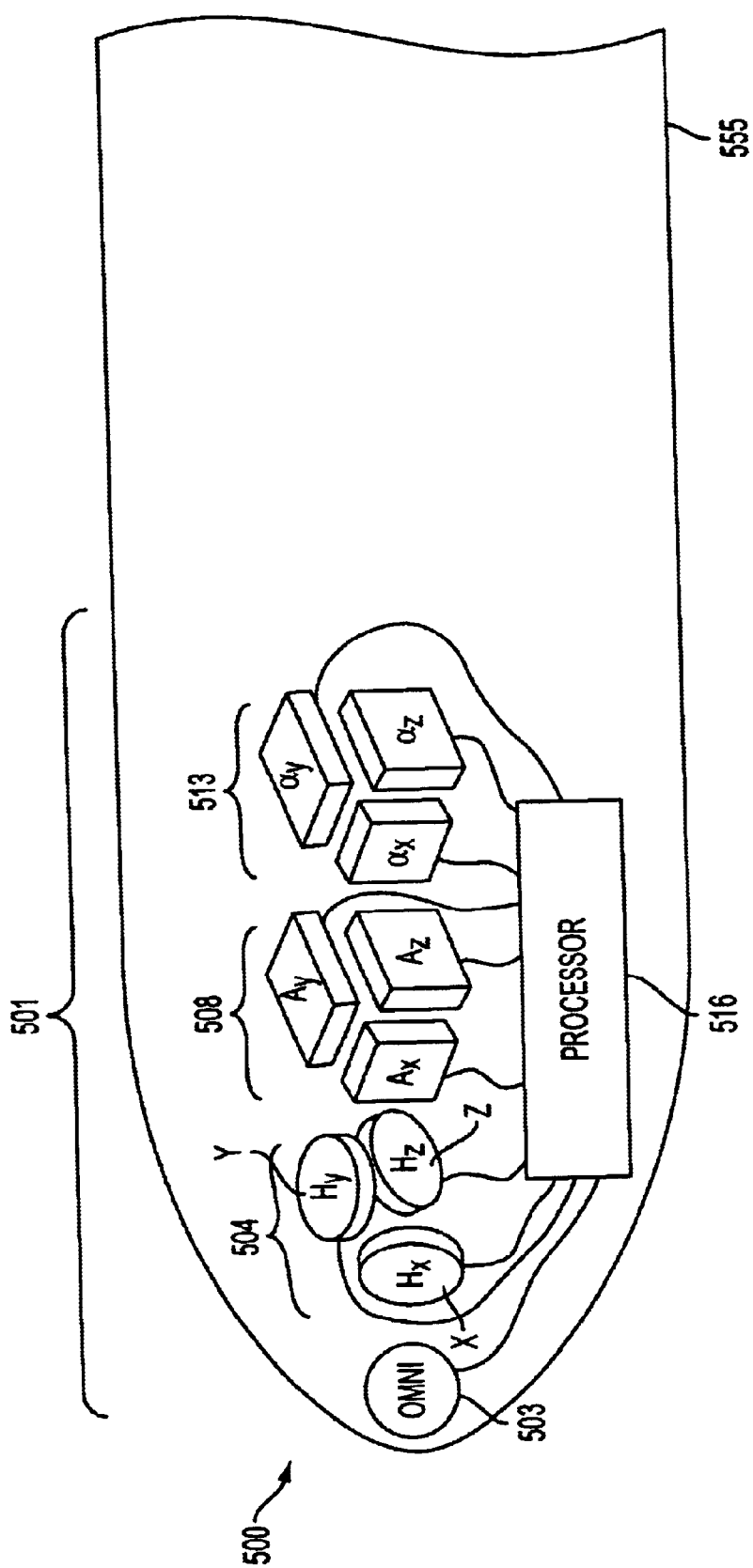
FIG. 5 is a block diagram of an electronic noise cancellation system embodiment according to the invention.

FIG. 5 is a block diagram of an electronic noise cancellation system embodiment 500 according to the invention. The noise cancellation system 500 may be a part of a seeker head 501 of a marine vessel, such as a torpedo 555 in this example. The noise cancellation system 500 of the seeker head 501 includes an omni-directional hydrophone 503, a plurality of directional hydrophones 504, a plurality of motion sensors (, accelerometers or acceleration sensors) 508, and a processor 516. The plurality of directional hydrophones 504, the plurality of motion sensors 508, and the omni-directional hydrophone 503 are connected to and communicate with the processor 516. A plurality of angular motion sensors 513 may optionally be included.

It should be understood that although the seeker head 501 is portrayed as employing a cluster of directional hydrophones, as discussed in U.S. Pat. No. 6,108,270, the invention applies equally well to hydrophone array configurations that determine a target angle through phase comparisons.

Motion of the seeker head 501 due to the effects of flow noise is primarily translational. Translational motion refers to the motion of all parts or points of an object in a uniform direction. This motion may be sensed by motion sensors. The flow noise, i.e., the vibrational noise present in the structure of the vessel, may affect the accuracy of the target determination by a sonar device, and may mask target sounds that are desired to be detected. This applies to a seeker head that measures directionality of a received sound as well as to a seeker head that measures phase differences.

As is known in the art, active noise cancellation works by sensing the noise to be canceled and in response generating a corresponding correcting signal. The correcting signal should be substantially equal in amplitude but opposite in phase to the noise signal. The correcting signal is generated and fed back at such a point and in such a manner as to attenuate or cancel out the unwanted signal. This may include generating a physical motion in the seeker head or generating a physical motion in the hydrophones. In addition, active noise cancellation may also include an electronic manipulation of a signal generated by a hydrophone or hydrophone cluster. Active noise cancellation is discussed in *Active Noise Control: A Tutorial Review*, by S. M. Kuo and D. R. Morgan, IEEE Proceedings, vol. 87, No. 6, June 1999, incorporated herein by reference.

The plurality of directional hydrophones 504 (i.e., the hydrophone cluster 504) is preferably three hydrophones $H_X$, $H_Y$, and $H_Z$, but other quantities may be employed as needed. The directional hydrophone cluster 504 may be mounted at any orientation. In one alignment configuration, one of the three directional hydrophones is aligned with the torpedo axis. Although this configuration is a natural one and is easy to visualize, it may suffer from a low angular resolution along the axis of the torpedo.

In another hydrophone alignment configuration, the axes of the directional hydrophones are oriented equiangularly from the axis of the torpedo. As a result, the axes of the hydrophones are spaced about 57.3 degrees from the axis of the torpedo. Advantageously, this configuration provides a maximum angular resolution along the axis of the torpedo.

A directional hydrophone cluster can determine a target angle using the directional hydrophone outputs and the omni-directional hydrophone output. Generally speaking, the hydrophone cluster may receive acoustic waves over a roughly spherical coverage pattern when using both the front and aft sections of the directional hydrophones. The sphere can be thought of as being composed of 8 equiangular right spherical triangles.

If the aft pointing portions of the three directional hydrophones are omitted, there will be one right spherical triangle pointing aft along the axis of the torpedo which none of the remaining hydrophone directional patterns will cover (assuming a configuration where the hydrophones are oriented equiangularly from the axis of the torpedo). Therefore, sound originating from within that aft pointing right spherical triangle will not be detected by any of the directional hydrophone segments. However, the target direction may still be determined if the target lies in any of the other seven right spherical triangles.

In a hydrophone configuration where each hydrophone is aligned with one of three orthogonal axes A, B, and C, and where each hydrophone axis is equiangularly oriented from the torpedo axis, forward pointing portion of these axes may be defined as positive and the aft pointing portion may be defined as negative. The torpedo axis is therefore centered in the center of quadrant 1 (triangle 1), and the closest that any plane containing two of these axes can come to the torpedo axis will be (90−57.3=32.7) degrees. The resulting 1–8 right spherical triangles may be designated by the limiting axes, as shown in table 1 below.

TABLE 1

| 1 | A+ | B+ | C+ |
| 2 | A+ | B+ | C− |
| 3 | A+ | B− | C+ |
| 4 | A+ | B− | C− |
| 5 | A− | B+ | C+ |
| 6 | A− | B+ | C− |
| 7 | A− | B− | C+ |
| 8 | A− | B− | C− |

Triangle (1) is the forward pointing right spherical triangle (i.e., centered on the axis of the torpedo). The direction of a sonic source within that triangle can be obtained by any of several different trigonometric methods. Triangle (8) is the aft pointing right spherical triangle, in which nothing can be detected by any of the remaining directional hydrophone segments. The triangles (2), (3) and (5) each have forward pointing hydrophone segments on two of its defining axes. Those two axes geometrically define a plane, which is essentially undefined outside the look angle of the two hydrophone segments. The direction of the sonic source within that plane can be determined by the ratio of the amplitudes of the signals in those two hydrophone segments, i.e., the projection of the direction of the sonic source onto that plane. The three dimensional direction of the sonic source may be anywhere on another plane (plane k) which is at right angles to the plane of the hydrophone axes and at the defined angle between those axes. Anywhere, that is, which is forward of the origin or intersection of those two axes.

The direction of a sonic source relative to the axis of any one of the directional hydrophones can be determined by taking the ratio of the amplitude of the signal in that directional hydrophone to the amplitude of the signal in the omni-directional hydrophone. The ratio will define a cone about the axis of the directional hydrophone at the angle off the axis determined by that ratio. Therefore, the direction of the sonic source is the intersection of the cone with the plane k. The cone will actually intersect plane k along two lines, but only one of those lines will lie within this right spherical triangle, hence that ambiguity is automatically resolved. The three dimensional direction may be optionally verified by additionally looking at a corresponding cone about the other of the two axes.

The accuracy of the direction obtained by the means suggested for triangles (2), (3), and (5) is not expected to be as good as the accuracy of three dimensional direction obtained soley using the three directional hydrophone segments. The omni-directional hydrophone will see some noise from the wake. Therefore, directions taken using the ratio of the sound amplitude in the directional hydrophone segment to that at the same frequency in the omni-directional hydrophone will be contaminated by this noise. The noise will cause the cone to lie somewhat further from the directional hydrophone axis than proper. Nonetheless, directional information in those right spherical triangles will be sufficient to turn the torpedo towards a sonic source.

In the triangles (4), (6), and (7), a sonic signal will only be available in one of the remaining directional hydrophone segments. That information will not be much more than the mere fact that a sonic source is present, and the number of the triangle in which it lies. With that, a simple roll of the torpedo in any direction will put the sonic source in a triangle in which better directional information can be obtained. Therefore, if a sonic source is detected in one of these triangles, the seeker-head will have enough information to put the torpedo into a turn toward the target.

The plurality of motion sensors 508 may be any type of motion sensor, such as an accelerometer. Alternately, force sensors such as load cells or strain gauges may be used. A motion sensor 508 senses a motion or acceleration on the torpedo 555 due to flow noise and produces an electrical output (hydrodynamic noise signal) in response. The motion sensors 508 therefore may be used by the processor 516 to detect flow noise acting on the torpedo.

In a preferred embodiment, there are three acceleration sensors $A_X$, $A_Y$, and $A_Z$, with each acceleration sensor being substantially aligned with a corresponding hydrophone of the three directional hydrophones $H_X$, $H_Y$, and $H_Z$. In phased array seeker heads, the three acceleration sensors $A_X$, $A_Y$, and $A_Z$ may be aligned with three orthogonal axes. In this manner, each acceleration sensor 508 measures acceleration on a corresponding directional hydrophone, and the resulting noise (acceleration) signals may be used to reduce or eliminate the effects of flow noise.

For example, a suitable acceleration sensor may be a model 697L accelerometer, available from Wilcoxon Research, Inc., Gaithersburg, Md. 20878. The acceleration capable of being measured by this particular accelerometer is specified in equivalent gravitational (g) forces per $\sqrt{Hz}$ of bandwidth, and is specified to have a resolution or accuracy of $2\times10^{-6}$ g/$\sqrt{Hz}$ of bandwidth at a 100 Hz operating frequency.

In use, the processor 516 receives an omni-directional signal from the omni-directional hydrophone 503 and receives output signals from the plurality of directional hydrophones 504. In addition, the processor 516 receives a plurality of hydrodynamic noise signals from the plurality of acceleration sensors 508. These signals may be subjected to any form of signal processing, such as filtering and amplification, before or in the processor 516. The processor 516 may sum the plurality of hydrodynamic noise signals, or otherwise process them, to produce one or more correcting signals. The one or more correcting signals are substantially related to the strength and spectrum of the flow noise. The correcting signals may then be used by the processor 516 to attenuate or eliminate the effects of the flow noise on the torpedo 555 (or other vessel). Therefore, in this electrical noise cancellation embodiment, a separate correcting signal is generated for each of the plurality of hydrophones. Each correcting signal is electronically subtracted from the output of the corresponding one of the plurality of directional hydrophones 504 (mechanical embodiments are discussed below in the text accompanying FIGS. 6 and 7). The signal from the omni-directional hydrophone 503 may optionally be subject to the active noise cancellation. In this manner, the noise cancellation system 500 may electronically attenuate or eliminate the effects of flow noise acting on the torpedo or vessel 555.

From the Doppler equation:

$$f_D = f_t[(c+v)/(c+v)] - f \quad (1)$$

where:
  $f_D$=Doppler frequency in Hz
  $f_t$=100 Hz (center frequency of the listening band of interest)
  c=4925 ft/sec (speed of sound in water)
  v=120 kts, or 202.53 ft/sec (closing speed)

Therefore, it can be determined that the bandwidth $f_D$ necessary to accommodate such a Doppler range is approximately 8.6 Hz, i.e., just under 9 Hz. For this bandwidth, the effective noise measured by an accelerometer would be about $6\times10^{-7}$ feet/second/second, as expressed in g forces. Therefore, the flow noise may be attenuated by the electronic noise cancellation from about 10 g down to about $6\times10^{-7}$ g (i.e., by a factor of about 72 db).

The noise cancellation system 500 in this example performs an electronic active noise cancellation process for a torpedo 555. However, the noise cancellation system 500 may be used for any marine vessel and for any active or passive sonar device.

The generation of the plurality of noise signals may be accomplished according to various active noise cancellation techniques known in the art. The noise cancellation system 500 may use feedback or may use feed-forward. The noise cancellation system 500 may be a hybrid system which uses a combination of feedback and feed-forward. The noise cancellation system 500 may use a lattice structure.

Each sample of flow noise measured by the acceleration sensors 508 will reflect a measured sum of translational accelerations since the preceding time sample. This sum of translational accelerations may include any translational acceleration propagating forward through the torpedo. This sum may also include a translational acceleration that compensates for the translational acceleration reported during the previous sampling time period.

The noise cancellation system 500 may optionally include a plurality of angular motion sensors 513. Three angular motion sensors $_X$, $_Y$, and $_Z$ may be included, and may be substantially aligned with the three directional hydrophones $H_x$, $H_y$, and $H_z$ in a frequency independent directional hydrophone seeker head configuration (as in the acceleration sensors 508). The plurality of angular motion sensors 513 may be placed at any convenient location within the torpedo so long as the rotational vibrations are within a correctable frequency band (it is assumed that flexure of the torpedo structure is negligible). However, co-location of the plurality of angular motion sensors 513 with the plurality of directional hydrophones 504 is preferred.

If there is an angular acceleration in either pitch or yaw of the vessel, the point about which the rotational vibration occurs will probably be well aft of the seeker head 501. As a result, the rotational vibration may be detected as a translational vibration, and may therefore be canceled by the seeker head 501 without any special consideration.

If the rotational vibration is not canceled, it may manifest as a jitter in the perceived direction to the target. The plurality of angular motion sensors 513 may therefore be included if it is desirable to minimize or remove this jitter.

Active noise cancellation may provide benefits such as increased detection accuracy, increased detection range, increased target discrimination accuracy (such as when multiple targets are present), etc. Active noise cancellation may therefore be advantageously applied to a sonar device.

Active noise cancellation may be applied in a torpedo seeker head that employs a cluster of directional hydrophones, such as the torpedo seeker head described in U.S. Pat. No. 6,108,270. This torpedo seeker head holds out the promise of rendering anechoic coating technology superfluous, provided the flow-noise can be significantly reduced. It is therefore appropriate that active noise cancellation techniques operate best at low frequencies, which is the optimum frequency regime for a frequency-independent torpedo seeker head. Another advantage of a torpedo seeker head employing directional hydrophones to determine a target angle, such as described in U.S. Pat. No. 6,108,270 is that it permits an ogival or paraboloid physical configuration for the torpedo nose. This will result in an increase in torpedo flank speed, an increase in torpedo endurance, or both.

In addition, the noise cancellation techniques discussed herein may be applied to sonar devices that use phase comparisons to determine a target direction. By canceling out flow noise, phase comparison sonar devices may also enjoy increased accuracy, range, target discrimination, etc.

Figure 6:
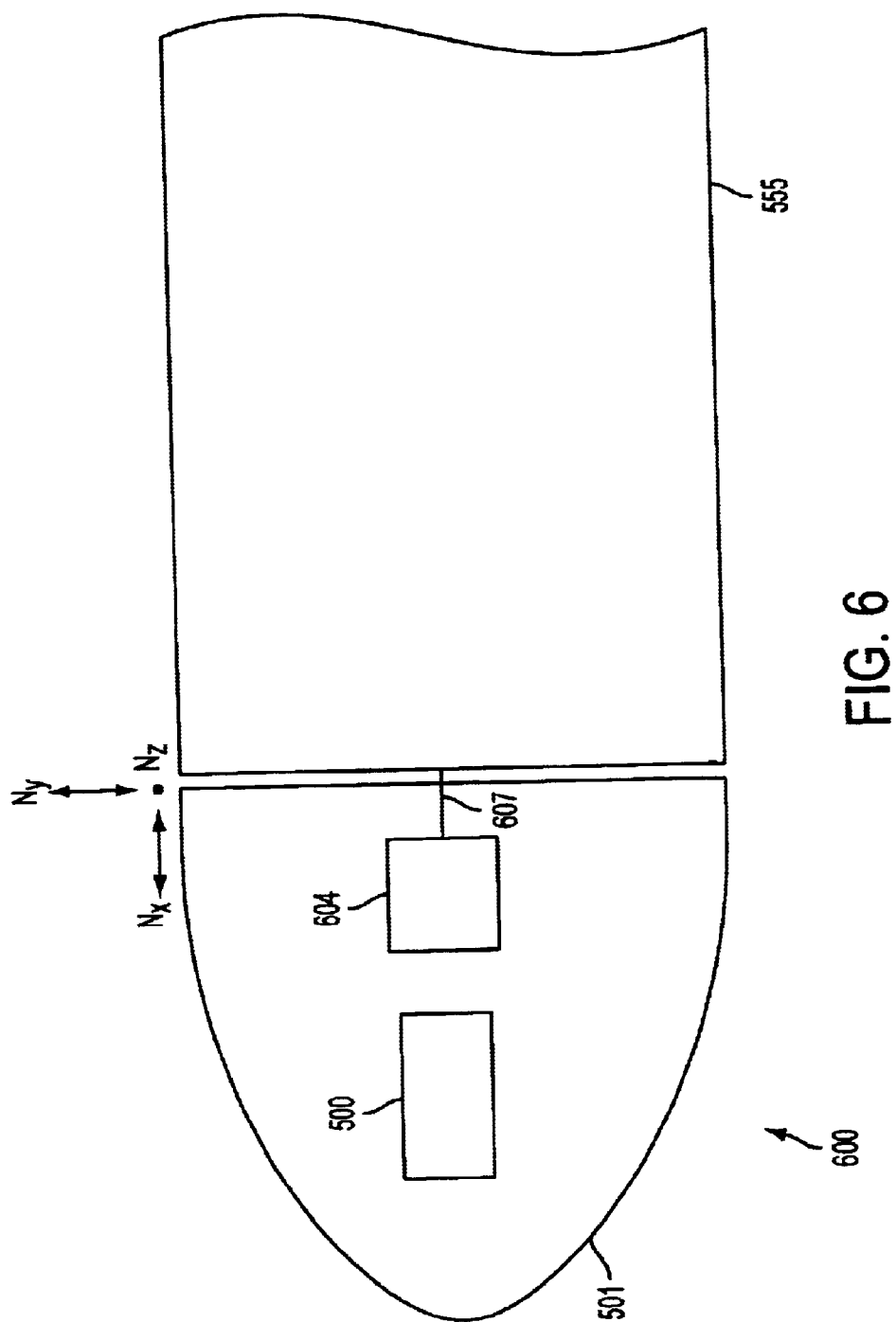
FIG. 6 is a block diagram of one mechanical noise cancellation system embodiment.

FIG. 6 is a block diagram of a first mechanical noise cancellation system embodiment 600. The noise cancellation system 600 includes a seeker head 501 that includes the noise cancellation system 500 (see FIG. 5) and at least one actuator 604. A mount 607 movably attaches the seeker head 501 to the torpedo 555 (or other vessel). The actuator 604, combined with the mount 607, may be employed to mechanically cancel the flow noise.

The mechanical noise cancellation may use the same accelerometers 508 as the electronic noise cancellation. In addition, the mechanical noise cancellation may employ the same directional hydrophones 504 and optionally the angular motion sensors 513, as previously discussed.

The actuator 604 may be an electrical servo motor. Alternatively, the actuator 604 may be any type of electrical, mechanical, pneumatic, or hydraulic actuator. The actuator 604 may comprise any number of individual actuators, with the number of actuators depending on the type of mount 607 and therefore the degrees of freedom of the seeker head motion.

The mount 607 may be any type of mechanical attachment to the torpedo 555 that allows the seeker head 501 to move in relation to the vessel or torpedo 555. The mount 607 may therefore comprise one or more gimbal mounts, as is known in the art. However, the type of mount is irrelevant, as long as it allows the seeker head 501 to mechanically cancel out the flow noise. Preferably, the mount 607 allows motion in three linear orthogonal axes, and more preferably also allows rotational motion around at least two of those axes (rotational motion along the torpedo's axis is not necessary).

Figure 7:
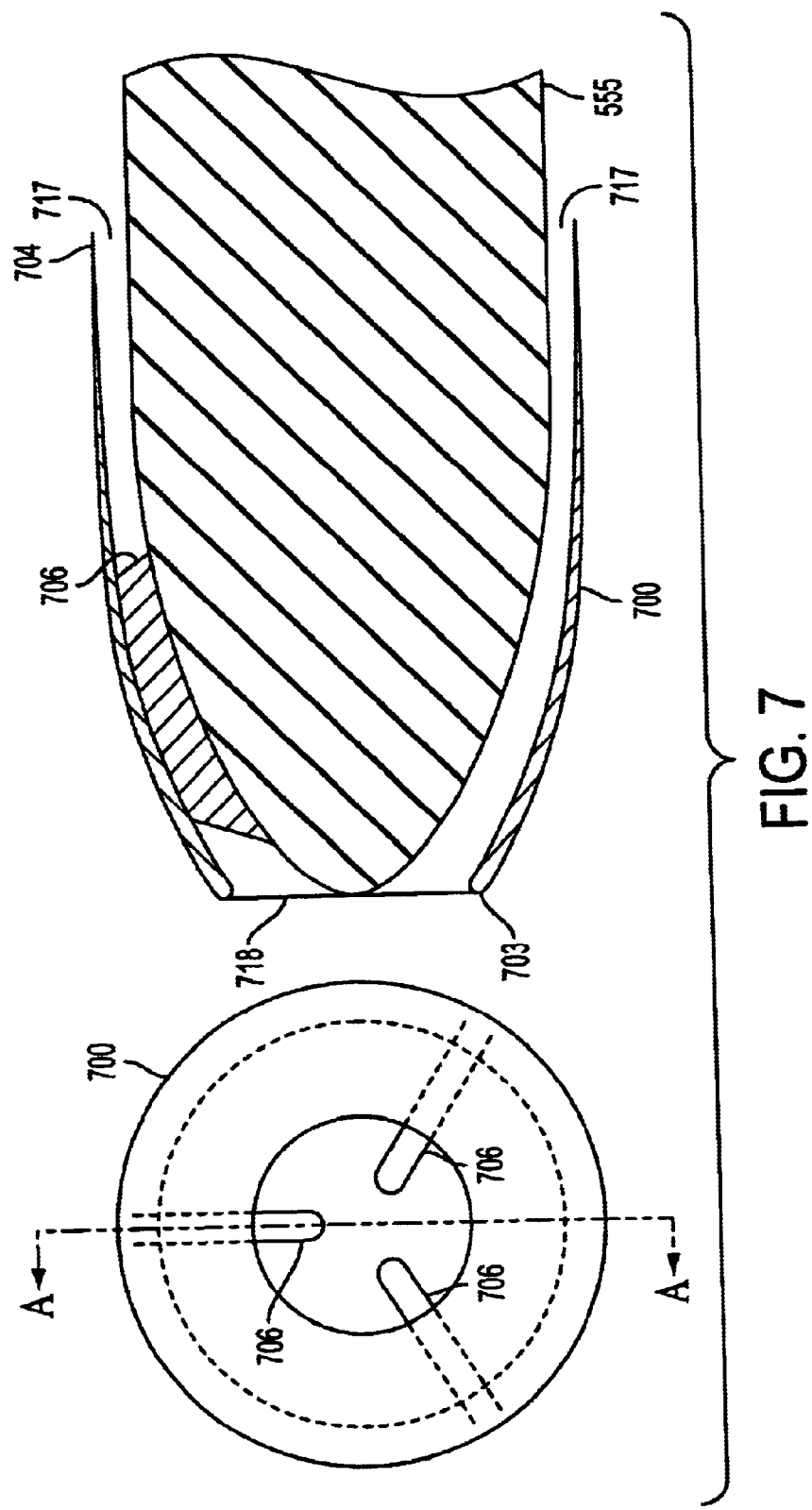
FIG. 7 shows a torpedo that includes a hydrodynamic flow noise reduction shroud.

In another embodiment (not shown), the seeker head 501 may include a shroud 700 attached by pylons 706 (see FIG. 7 and accompanying text). In this embodiment, the seeker head 501 and the shroud 700 may be mechanically actuated to cancel the flow noise.

In the electronic noise cancellation technique, the correction may be done simply by subtracting one or more correcting signals from the plurality of directional signals. In contrast, the mechanical noise cancellation technique may have limitations. In order to satisfactorily physically actuate a hydrophone cluster or a seeker head, the mechanical components must be selected and designed to adequately perform the required mechanical motion. Preferably, an acceleration sensor is chosen so that the maximum measurable g force matches or exceeds the maximum expected g forces on the torpedo 555.

The achievable degree of cancellation does not depend highly on the characteristics of the acceleration sensors (although the electronic noise cancellation may depend on the characteristics). However, it does depend on the sampling rate. If the flow noise lies in a band centered at about 100 Hz, a seeker head sampling rate $f_t$ must be 200 Hz or higher. This implies that the flow noise will be measured and mechanically canceled 100 times per second. If the actuator 604 cannot move the seeker head 501 an adequate distance in this configuration, the noise cancellation system 600 may operate at a higher sampling rate $f_r$. If the sampling rate is 10 kHz the maximum countering acceleration which must be applied during any inter-sample period will be reduced from the maximum acceleration (without noise cancellation) by a factor equal to about sine 3.6 degrees, i.e., by a factor of about 0.0628. This is approximately equal to 12 db.

A critical factor is the required range and bandwidth of a physical motion needed to perform active noise cancellation. If a torpedo is an airborne torpedo, the target (such as a submarine) may be moving away from the torpedo at the moment of surface entry. If the maximum target speed is 30 knots (kts), and the flank torpedo speed is 60 kts, the torpedo seeker head may experience a range of Doppler effects as a result of closing velocities of from −30 kts (at the moment of surface entry) to +90 kts (should the target turn toward the torpedo as an evasive maneuver).

Having measured the acceleration of the seeker head, it is necessary for the actuator 604, such as a servo motor, for example, to exert the force necessary to counter the acceleration. The force equation is:

$$f = m*a \qquad (2)$$

where m is the mass of the seeker head (or at least that part of it which is forward of the gimbals) and a is the measured acceleration. Therefore, the force necessary to reduce the measured acceleration to zero may be calculated. The maximum mechanical acceleration to be exerted by the actuator 604 between any two time samples is the algebraic sum of the noise signals obtained during a current sampling time period. In addition, the sum may optionally include the correctional acceleration due to the sum of accelerations during the preceding sample time period. Therefore, the maximum total acceleration generated due to the mechanical noise cancellation is equal to the maximum acceleration during any one sample time period, due solely to the structure borne noise.

However, the measured acceleration cannot as a practical matter be reduced to zero, as there is a time lapse between samples. Accordingly, there is a time lapse between applications of countering forces (assuming the countering forces are fully applied during the inter-sampling period). Therefore, there will be a remaining error motion. The remaining error motion is proportional to the integral of the acceleration force/signal over the inter-sampling period. It follows that by increasing the sampling rate, the remaining error motion may be decreased.

It should be understood that an active noise cancellation system according to the invention may employ either an electronic noise cancellation apparatus, a mechanical noise cancellation apparatus, or both. The active noise cancellation may be the most effective when both are employed.

Since the noise cancellation by the mechanical and electronic noise cancellations can be additively employed, the total noise cancellation may be as great as about 84 decibels (db). However, in application the noise cancellation may be less, depending on materials, tolerances, response times of the cancellation activity, etc.

FIG. 7 shows a torpedo 555 that includes a hydrodynamic flow noise reduction shroud 700 (not to scale). The shroud 700 extends between a leading edge 703 and a trailing edge 704, and includes a front aperture 718, a rear aperture 717, and a plurality of pylons 706 that affix the shroud 700 to the torpedo 555. The leading edge 703 may be rounded and the trailing edge 704 may be tapered. The front aperture 718 allows water to flow in and around the nose region of the torpedo 555 and exit through the rear aperture 717.

The shroud 700 is an alternative noise reduction system that may be employed to attenuate or eliminate flow noise. The shroud 700 prevents flow separation of the water flow from the torpedo 555 until after the trailing edge 704. Therefore, the shroud 700 helps to reduce and move aft the flow separation and resulting turbulence that cause the flow noise. The shroud 700 may provide an additional benefit in that it may minimize or reduce the hydrodynamic drag, thus improving torpedo maximum speed and endurance.

The shroud 700 is maintained in a spaced-apart relation from the torpedo 555 by the pylons 706. The pylons 706 hold the shroud 700 in place on the nose of the nose region of the torpedo 555. In a preferred embodiment, there are at least three pylons 706, such as three spaced circumferentially around the torpedo at approximately 120 degrees from each other. Alternatively, the shroud 700 may include six pylons 706 that are spaced 120 degrees apart in front-back pairs, or may be spaced 60 degrees apart. The pylons 706 shown are merely representative and may be of other sizes and shapes and other locations.

The shroud 700 preferably maintains a substantially constant area channel for fluid flow, from the front aperture 718 to the rear aperture 717, but may be narrowed toward the rear aperture in order to provide a fluid nozzle, should such nozzle be desired. The shape of the shroud preferably follows the contour of the nose region of the torpedo 555, and may be paraboloid or ogival in shape, for example. Alternatively, the shroud 700 may be of any shape that increases in diameter toward the aft end of the torpedo 555. The shroud 700 preferably extends substantially from a tip of the torpedo 555 to a region where the torpedo 555 achieves a substantially uniform diameter. The maximum diameter of the shroud 700 may vary, and may be larger than, equal to, or smaller than the maximum diameter of the torpedo 555. In one embodiment, the maximum diameter of the shroud does not exceed the diameter of the the torpedo 555.

The omni-directional hydrophone 503 may be constructed as a ring (not shown) in the shroud 700. Alternatively, the omni-directional hydrophone 503 may be mounted in the nose of the seeker head 501 or torpedo 555, and three directional hydrophones 504 may be mounted in the pylons 706.

Each directional hydrophone 504 may have two opposing reception surfaces and may be embedded in a pylon 706 such that one reception surface faces forward and the other reception surface faces aft. Each directional hydrophone 504 may therefore receive signals in its forward lobe via its forward reception surface and in its aft lobe via its aft reception surface. Alternately, the aft facing surfaces and/or segments may be omitted.

In one shroud embodiment (not shown), there may be six pylons 706 affixing the shroud 700 to the torpedo 555. The three forward pylons 706 may include the three forward reception surfaces of the three directional hydrophones 504. These hydrophone segments may have their aqueous interfaces flush with the outer surface of the shroud 700. Likewise, three aft pylons 706 may include the aft reception surfaces of the three directional hydrophones 504. These hydrophone segments may or may not have their aqueous interfaces flush with the outer surface of the shroud. If the pylons 706 are considered to be paired, with one forward and one aft pylon included in a pair, then the cross-section of the pair of pylons may be held constant over a majority of their total length, especially including the trailing portion of the leading pylon and the leading portion of the trailing pylon.

If the axes of the directional hydrophones are oriented equiangularly from the axis of the torpedo, the directional hydrophones may be formed in two sections. Each hydrophone half may have a directional response equal to the cosine of the angle off of the axis of the hydrophone, so long as that angle is less than 90 degrees, and zero elsewhere. Therefore the aft facing portions of the hydrophones may be omitted. Omission of the aft facing portions may reduce production costs and may reduce hydrophone circuitry. Furthermore, fewer parts mean greater simplicity and reliability.

An additional major advantage is the reduction in flow noise. Most of the flow noise comes to the hydrophones as structure borne noise, which can be adequately handled via active noise cancellation. However, some low frequency noise may be transmitted to the hydrophones through the water (called "pseudo-noise"). The pseudo-noise emanates from the wake of the torpedo. Eliminating the rear-facing sections of the directional hydrophones eliminates the likelihood of picking up the pseudo-noise.

Figure 8:
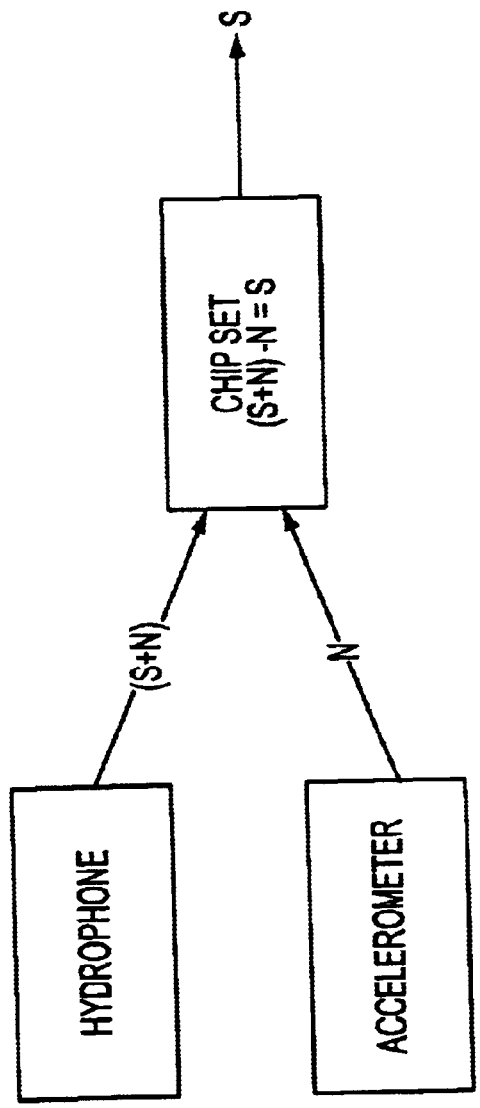
FIG. 8 is a diagram of a noise cancellation method according to one embodiment of the invention.

FIG. 8 is a diagram of a noise cancellation method according to one embodiment of the invention. The flow noise acting on the vessel is detected by one or more acceleration sensors, such as one or more accelerometers. The flow noise may be detected as impulse accelerations or vibrations acting on the torpedo at the point of one or another of the directional hydrophones. In response to the flow noise, a noise signal (N) is generated by the accelerometers. The noise signal substantially replicates the flow noise acting on and affecting the vessel. The noise signal may be digitally sampled or quantized.

The hydrophones generate one or more output signals, with an output signal (S+N) including a sound component (S) and a noise component (N). The noise component is the flow noise picked up by the hydrophones. Depending on the design of the hydrophone, it may measure either pressure variations at the face of the hydrophone or variances in dimension from the face of the hydrophone to some central point resulting from those pressure variations. The pressure or dimensional variations may be determined or predicted at every desired point in time from the measured accelerations.

In one noise cancellation method embodiment, the active noise cancellation techniques are applied to the sound plus noise (S+N) signal in order to electronically (digitally) subtract the noise signal and produce a substantially pure sound signal (S). When the noise signal (N) is subtracted from the hydrophone output signal (S+N), the resulting corrected hydrophone output signal (S) is substantially free of flow noise. In this manner, the flow noise may be electronically attenuated or eliminated from the directional signal.

In another noise cancellation method embodiment, the seeker head and hydrophones are mechanically actuated to counteract the flow noise. Therefore, the seeker head (or the component hydrophones) are physically moved in a manner that substantially cancels out the forces on the hydrophones due to the flow noise. This may entail moving the torpedo seeker head as much as several centimeters and in a response time of milliseconds.

It should be understood that an active noise cancellation system according to the invention may employ either the mechanical noise cancellation method, the electronic noise cancellation method, or both. The active noise cancellation may be the most effective when both methods are employed.

Since the noise cancellation by the mechanical and electronic noise cancellation methods can be additively employed, the total noise cancellation may be as great as about 84 decibels (db). However, in application the noise cancellation may be less, depending on materials, tolerances, response times of the cancellation activity, etc.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A noise cancellation system adapted for use with a seeker head of a marine vessel, with said seeker head employing one or more hydrophones generating one or more output signals, comprising:
   a plurality of motion sensors, with said plurality of motion sensors generating a plurality of noise signals based on a hydrodynamic flow noise caused by said marine vessel and acting on said marine vessel; and
   a processor receiving said plurality of noise signals and said one or more output signals and applying an active noise cancellation to said one or more output signals to substantially cancel out said hydrodynamic flow noise, with said active noise cancellation being based on said noise signal.

2. The noise cancellation system of claim 1, wherein said plurality of motion sensors comprises a plurality of acceleration sensors.

3. The noise cancellation system of claim 1, further comprising a mount movably attaching said seeker head to said marine vessel and at least one actuator connected to said mount, with said mount and said at least one actuator being capable of moving said seeker head with respect to said marine vessel, and wherein said processor and said at least one actuator move said seeker head in response to said plurality of noise signals.

4. The noise cancellation system of claim 1, with said marine vessel comprising a torpedo and with said noise cancellation system further comprising:
   a substantially ring-shaped shroud adapted to be affixed over a nose portion of said torpedo, with said nose portion including said seeker head;
   a mount movably attaching said seeker head and said ring-shaped shroud to said torpedo; and
   at least one actuator connected to said mount, with said mount and said at least one actuator being capable of moving said seeker head and said ring-shaped shroud with respect to said marine vessel;
   wherein said processor and said at least one actuator move said ring-shaped shroud and said seeker head in response to said plurality of noise signals.

5. The noise cancellation system of claim 1, with said one or more hydrophones comprising three directional hydrophones and with a plurality of acceleration sensors comprising three acceleration sensors, with each acceleration sensor of said three acceleration sensors being substantially aligned with a corresponding directional hydrophone.

6. The noise cancellation system of claim 1, with said one or more hydrophones comprising an array of hydrophones and with a plurality of acceleration sensors comprising three acceleration sensors, with said three acceleration sensors being substantially aligned with three orthogonal axes.

7. The noise cancellation system of claim 1, further comprising one or more angular motion sensors, and wherein said one or more angular motion sensors provide one or more angular motion signals to said processor, with said processor factoring said one or more angular motion signals into said active noise cancellation.

8. The noise cancellation system of claim 1, with said marine vessel comprising a torpedo and with said noise cancellation system further comprising:
   a substantially ring-shaped shroud extending between a leading edge and a trailing edge and including a front aperture and a rear aperture, with said ring-shaped shroud being adapted to be affixed over a nose portion of said torpedo and with said ring-shaped shroud maintaining a substantially constant aperture area between said ring-shaped shroud and said nose portion, and with a reduction in said aperture area occurring in a rearmost portion of said ring-shaped shroud in order to form a fluid nozzle; and
   a plurality of pylons adapted to affix said ring-shaped shroud in a spaced-apart relation from said nose portion.

* * * * *